No. 891,190. PATENTED JUNE 16, 1908.
J. R. SELZER.
DRINKING FOUNTAIN.
APPLICATION FILED MAY 22, 1907.

2 SHEETS—SHEET 1.

WITNESSES:
Thos. W. Riley
E. F. Head.

INVENTOR
J. R. Selzer
By W. J. FitzGerald & Co.
Attorneys

No. 891,190. PATENTED JUNE 16, 1908.
J. R. SELZER.
DRINKING FOUNTAIN.
APPLICATION FILED MAY 22, 1907.

2 SHEETS—SHEET 2.

Witnesses
Thos. W. Riley
E. F. Head.

Inventor
J. R. Selzer
By W. J. Fitzgerald Co.
Attorneys

UNITED STATES PATENT OFFICE.

JOHN R. SELZER, OF MORNING SUN, IOWA, ASSIGNOR TO E. M. SELZER, F. C. SELZER, AND J. ED. SELZER.

DRINKING-FOUNTAIN.

No. 891,190.  Specification of Letters Patent.  Patented June 16, 1908.

Application filed May 22, 1907. Serial No. 375,141.

*To all whom it may concern:*

Be it known that I, JOHN R. SELZER, a citizen of the United States, residing at Morning Sun, in the county of Louisa and State of Iowa, have invented certain new and useful Improvements in Drinking-Fountains; and I do hereby declare the following to be a full, clear, and exact description of the invention, such as will enable others skilled in the art to which it appertains to make and use the same.

My invention relates to new and useful improvements in drinking fountains and more particularly to that class adapted to be used for supplying water to poultry and animals of various kinds, and my object is to provide a fountain of this class whereby but a slight quantity of the contents thereof will be placed in reach of the animals or poultry at one time.

A further object is to provide means for readily filling the fountain.

A still further object is to provide means for transporting the fountain from place to place, and a still further object is to provide means whereby the walls of the fountain may expand in case of freezing.

Other objects and advantages will be hereinafter referred to and more particularly pointed out in the claims.

Figure 1:
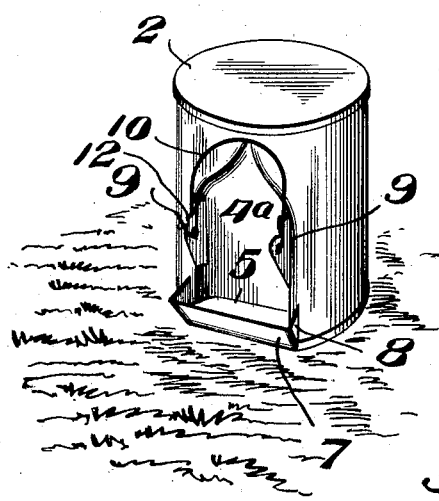
Figure 2:
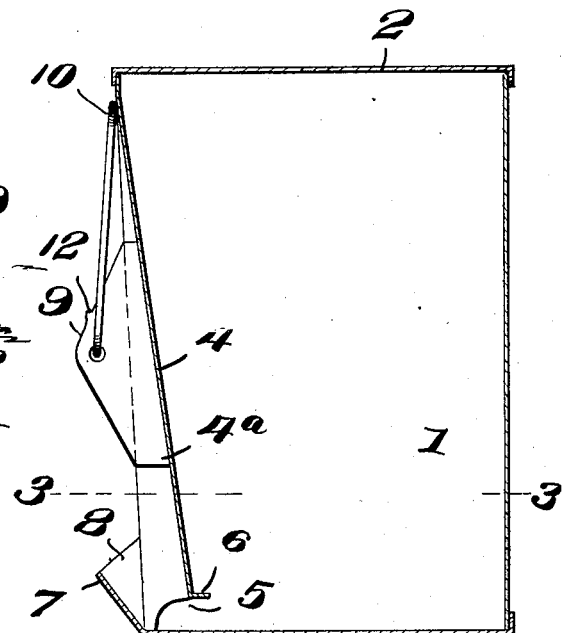
Figure 3:
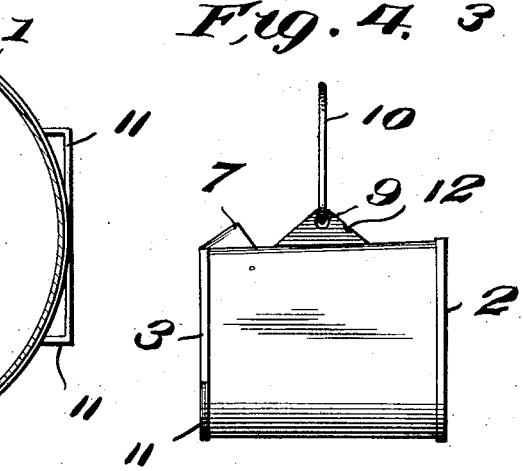
Figure 4:
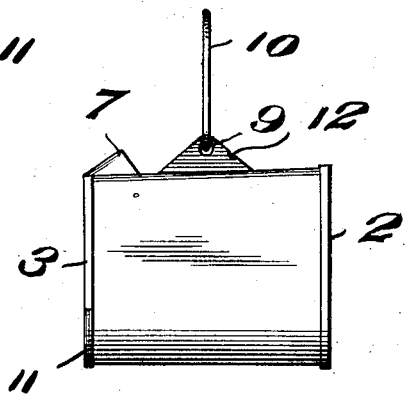
Figure 5:
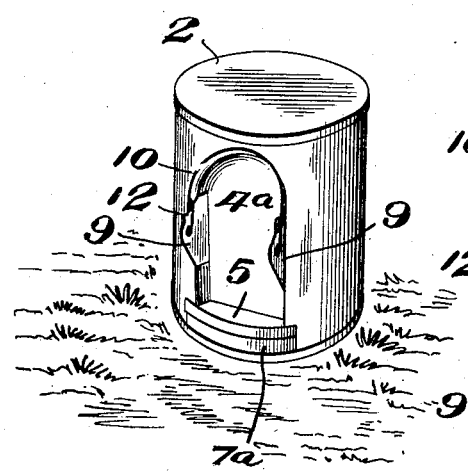
Figure 6:
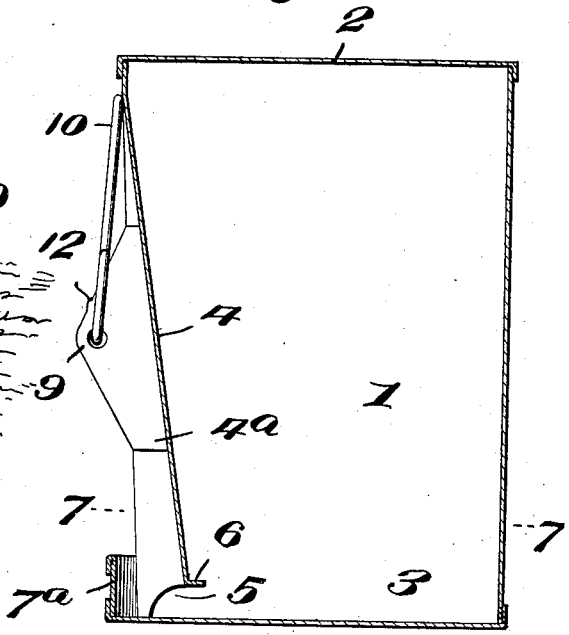
Figure 7:
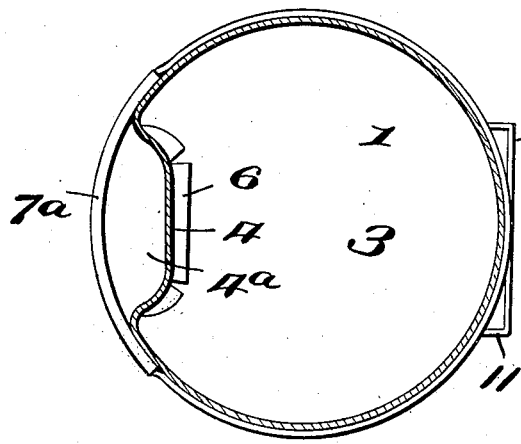
Figure 8:
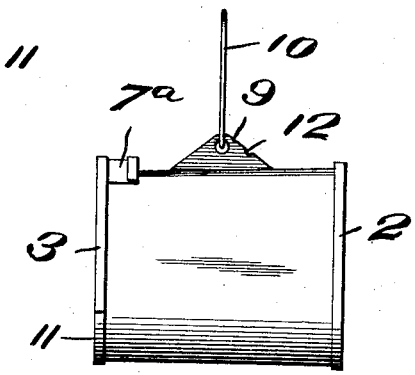

In the accompanying drawings which are made a part of this application, Figure 1 is a perspective view of my improved drinking fountain complete. Fig. 2 is a vertical sectional view thereof. Fig. 3 is a transverse sectional view as seen on line 3—3, Fig 2. Fig. 4 is a side elevation of the fountain in the position when being transported. Fig. 5 is a perspective view of a slightly modified form of fountain from that shown in Fig. 1. Fig. 6 is an enlarged central sectional view thereof. Fig. 7 is a transverse sectional view as seen on line 7—7, Fig. 6, and Fig. 8 is a side elevation of this form of fountain when the same is being transported.

Referring to the drawings in which similar reference numerals designate corresponding parts throughout the several views, 1 indicates the tank or body of my improved fountain, which is preferably cylindrical and provided at its ends with closures 2 and 3.

The fountain, when being employed for dispensing water, rests upon the closure 3 and in order to properly dispense the contents of the tank, one section of the wall 4 of the tank is directed inwardly, to form a depression $4^a$, which gradually tapers inwardly from its upper end and an opening 5 is formed at the lower end of the depression by bending inwardly the extreme lower end of the wall of the depression and directing the same at right angles to the longitudinal axis of the depression to form a rib 6, said rib serving to reinforce the wall around the opening. The object in so tapering the wall 4 is to cause the water to flow towards the opening 5 when the tank is being filled.

Extending across the lower end of the depression 4 is a trough 7, which is preferably formed integral with the closure 3 and has its end walls 8 secured to the wall of the tank in any preferred manner, as by soldering, and the trough is of sufficient height to extend above the opening 5 so that when the tank is dispensing the water therefrom and the trough 7 has become filled to a point above the upper edge of the opening, a vacuum will be formed in the upper end of the tank and thereby stop the flow of the water into the trough until such time as the water in the trough is consumed, when an additional flow will result sufficiently to close the opening 5 when the flow will again be stopped.

By directing the wall 4 inwardly to form the depression $4^a$ and curving the same at its juncture with the remainder of the wall of the tank, it will be seen that should the water in the tank freeze and expand, the wall 4 will yield and compensate for the expansion of the frozen water, thereby obviating any possibility of opening the seams of the tank or otherwise causing leakage.

Secured to the floor of the wall 4 and at the longitudinal center of the tank 1 are ears 9, to which is secured a bail 10, by which the tank is carried from place to place, as shown in Fig. 4. When the tank is being carried by the bail 10, the depression $4^a$ is at the upper side of the tank so that the water in the tank will not run out, and it will also be seen that by this arrangement the tank can be inserted below a pump spout or spigot, so that the water entering the depression $4^a$ will be carried to the opening 5 and deposited in the tank, thereby rendering the filling of the tank a very easy matter.

As the tank is preferably constructed cylindrical, I provide means for preventing the tank from rolling or turning over when the same is being filled, or otherwise resting with the depression $4^a$ uppermost, by securing to that side of the tank diametrically opposite the depression 4ª, brackets 11, which extend outwardly from each side of the tank, as best shown in Fig. 3 of the drawings, and form a base for the tank when the tank is in a horizontal position.

The ears 9 are of sufficient dimensions to extend at a considerable height above the floor of the depression 4ª, and at a distance to either side of the center of the drinking fountain, to form guards, so that when water is being placed in the fountain, the ears will prevent the water from splashing over the sides of the depression, and each of the ears is provided with a lug 12, which is so arranged that when the fountain is resting on its end, the bail 10 may be swung upwardly and beyond the lugs on the ears, said lugs holding the bail in its elevated position, the lug being preferably formed by kinking or bending out a portion of the ears.

In Figs. 5 to 8, inclusive, I have shown a slightly modified form of fountain, in that the wall of the trough 7ª is separated from the closure 3 and extends vertically when the fountain is resting on end instead of being flared outwardly, the lower edge of the wall of the trough being engaged by the flange on the cover 3, while the ends of the wall forming the trough are soldered, or otherwise secured to the outer wall of the fountain. By constructing the trough in this manner, the wall thereof does not protrude beyond the wall of the tank.

After the tank has been filled with water, it may be transported to any convenient point through the medium of the bail 10 and placed in operation for automatically feeding the water into the trough, by resting the tank on the closure 3 and causing the same to assume a vertical position.

It will thus be seen that I have provided a very cheap and economical form of fountain and one that can be transported from place to place without in any manner disturbing or losing the contents of the tank. It will also be seen that I have provided means to compensate for any expansion caused by the freezing of the water in the tank, thereby obviating any possibility of the tank becoming destroyed by the expansion of the frozen water.

What I claim is:

1. A drinking fountain of the class described comprising a tank having a portion of its wall directed inwardly to form a depression, said depression being tapered and having an opening in one end thereof, a rib surrounding said opening and a trough across said opening and extending thereabove whereby the flow of the water will be stopped when a certain height has been reached in the trough.

2. A drinking fountain of the class described, comprising a tank having a portion of its wall directed inwardly to form a depression, said depression being tapered and having an opening at its lowest end, a rib integral with the wall of the depression substantially at right angles thereto, a trough extending across said opening and above the upper edge of the opening, and means to transport said tank when desired.

3. A drinking fountain of the class described, comprising a cylindrical tank, a closure for each end of said tank, a portion of the wall of said tank being directed inwardly to form a depression, said depression being tapered from its upper to its lower end, and having an opening at its lower end, a rib surrounding said opening, a trough integral with one of said closures and extending upwardly therefrom above the opening in the depression, ears secured to said tank, a bail secured to said ears, whereby said tank may be transported and brackets for said tank whereby the same is held in a fixed position when the tank is resting horizontally.

4. A drinking fountain of the class described, comprising a cylindrical tank, a closure for each end of said tank, a portion of the wall of said tank being directed inwardly to form a depression, said depression being tapered from its upper to its lower end and having an opening at its lower end, a rib surrounding said opening on the inner face of the wall of the tank, a trough integral with one of said closures and extending upwardly therefrom above the opening in the depression, ears secured to the wall of said tank at its longitudinal center and at the sides of said depression, a bail secured to said ears, lugs on said ears and brackets on the opposite side of said tank whereby the same may be held in a fixed position when the tank is resting horizontally.

In testimony whereof I have signed my name to this specification in the presence of two subscribing witnesses.

JOHN R. SELZER.

Witnesses:
FRED C. SELZER,
C. V. LE BOUTILLIER.